US010454695B2

(12) United States Patent
Viera et al.

(10) Patent No.: US 10,454,695 B2
(45) Date of Patent: Oct. 22, 2019

(54) TOPICAL GROUP COMMUNICATION AND MULTIMEDIA FILE SHARING ACROSS MULTIPLE PLATFORMS

(71) Applicant: Fuze, Inc., Cambridge, MA (US)

(72) Inventors: Julio Viera, Brooklyn, NY (US);
Jedidiah Brown, Brooklyn, NY (US);
Keith Johnson, Cambridge, MA (US);
Luke Surazski, Cambridge, MA (US);
Clement Wehrung, Paris (FR); Alan Sapede, Boston, MA (US)

(73) Assignee: FUZE, INC., Boston, MA (US)

( * ) Notice: Subject to any disclaimer, the term of this patent is extended or adjusted under 35 U.S.C. 154(b) by 0 days.

(21) Appl. No.: 15/831,246

(22) Filed: Dec. 4, 2017

(65) Prior Publication Data
US 2018/0302233 A1 Oct. 18, 2018

Related U.S. Application Data

(60) Provisional application No. 62/486,435, filed on Apr. 17, 2017.

(51) Int. Cl.
G06F 15/16 (2006.01)
H04L 12/18 (2006.01)
G06Q 10/10 (2012.01)
G06F 17/24 (2006.01)
H04L 12/58 (2006.01)

(52) U.S. Cl.
CPC ........ H04L 12/1822 (2013.01); G06F 17/241 (2013.01); G06Q 10/101 (2013.01); H04L 12/1818 (2013.01); H04L 12/1831 (2013.01); H04L 51/04 (2013.01)

(58) Field of Classification Search
CPC ............. H04L 12/1822; H04L 12/1818; H04L 12/1831; H04L 51/04; G06F 17/241; G06Q 10/101
See application file for complete search history.

(56) References Cited

U.S. PATENT DOCUMENTS

2004/0215784 A1* 10/2004 Qi ........................... H04L 67/14
709/227
2006/0095514 A1* 5/2006 Wang .................. G06Q 10/107
709/204
2006/0117042 A1* 6/2006 Hu ......................... G06Q 10/10
2008/0183815 A1* 7/2008 Unger ................. H04L 12/1818
709/204

(Continued)

Primary Examiner — Jonathan A Bui
(74) Attorney, Agent, or Firm — McDermott Will & Emery LLP

(57) ABSTRACT

A method including receiving, from a participant, a request for starting an event including at least one second participant and a topic is provided. The method includes providing to one second participant an invitation to join the event, receiving, from any one of the participants, a document, and providing the document to all participants for view and/or editing, and providing the document to all participants upon request within a time period. The method includes granting access to the event to a participant, permitting the participant to access and modify the document in the event, and receiving a request from one of the participants to switch one of the first client device or a second client device used by a participant to continue to participate in the event. A system to perform the above method is also provided.

20 Claims, 8 Drawing Sheets

(56) References Cited

U.S. PATENT DOCUMENTS

| | | | | |
|---|---|---|---|---|
| 2012/0214564 A1* | 8/2012 | Barclay | ............... | G07F 17/3227 |
| | | | | 463/11 |
| 2014/0095871 A1* | 4/2014 | Hoard | ................ | H04L 63/0428 |
| | | | | 713/168 |
| 2014/0156854 A1* | 6/2014 | Gaetano, Jr. | ........ | H04L 65/1069 |
| | | | | 709/227 |
| 2014/0226537 A1* | 8/2014 | Kashimba | ........... | H04L 65/1069 |
| | | | | 370/261 |
| 2014/0254688 A1* | 9/2014 | Tian | ..................... | G06F 3/1462 |
| | | | | 375/240.25 |
| 2015/0006332 A1* | 1/2015 | Kinarti | ................... | G06Q 10/10 |
| | | | | 705/27.1 |
| 2016/0316174 A1* | 10/2016 | Whynot | ................. | H04L 49/35 |
| 2017/0185574 A1* | 6/2017 | Fern | .................... | G06Q 10/103 |
| 2017/0237784 A1* | 8/2017 | Maistri | ............... | H04L 65/1083 |
| | | | | 348/14.02 |
| 2017/0308610 A1* | 10/2017 | Mullins | ................ | G06F 16/951 |
| 2018/0173378 A1* | 6/2018 | Tinari | ................. | G06F 17/2288 |
| 2018/0314976 A1* | 11/2018 | Miao | ...................... | H04L 51/32 |
| 2018/0337968 A1* | 11/2018 | Faulkner | ............. | H04L 65/4015 |
| 2018/0359293 A1* | 12/2018 | Faulkner | ............... | H04L 65/403 |
| 2019/0200054 A1* | 6/2019 | Dharmaji, Sr. | ............................. | |
| | | | | H04N 21/234309 |

* cited by examiner

TOPICAL GROUP COMMUNICATION AND MULTIMEDIA FILE SHARING ACROSS MULTIPLE PLATFORMS

CROSS-REFERENCE TO RELATED APPLICATIONS

The present disclosure is related to and claims priority under 35 U.S.C. § 119(e) of U.S. Provisional Patent Application No. 62/486435, entitled "TOPICAL GROUP COMMUNICATION AND MULTIMEDIA FILE SHARING ACROSS MULTIPLE PLATFORMS," by Keith Johnson et-al, filed on Apr. 17, 2017, the contents of which are hereby incorporated by reference in their entirety, for all purposes.

BACKGROUND

Field

The present disclosure generally relates to topical group communication including multimedia file sharing across multiple platforms. More specifically, the present disclosure relates to synchronous and asynchronous group sessions enabling content sharing and access through multiple platforms.

Description of the Related Art

Current platforms for group chats and conversations are severely limited by bandwidth and a lack flexibility as to the communication modality selected for the chat or conversation. Moreover, current platforms are mostly focused on static content, which becomes inaccessible or lost after certain period of time lapses, or after the event is terminated. Another problem that arises in current group chat platforms is the lack of bandwidth to sustain a seamless multi-party communication experience including the different technical capabilities of the client devices used by each participant.

SUMMARY

In one embodiment of the present disclosure, a computer-implemented method is described for receiving, from a first participant having access to a first client device, a request for starting a collaborative communication event including at least one second participant and a topic, providing to the at least one second participant an invitation to join the collaborative communication event, and receiving, from any one of the first participant and the at least one second participant, a document, and providing the document to all participants for view and/or editing. The computer-implemented method includes providing the document to all participants upon request within a selected period of time, asynchronously granting access to the collaborative communication event to at least one third participant, and permitting the at least one third participant to access and modify the document in the collaborative communication event. The computer-implemented method also includes receiving a request from the at least one third participant to switch a third client device used by the at least one third participant to continue to participate in the collaborative communication event.

According to one embodiment, a system is described that includes one or more processors and a memory coupled to the one or more processors, the memory including instructions that, when executed by the one or more processors, cause the one or more processors to receive, from a first participant having access to a first client device, a request for starting a collaborative communication event including at least one second participant and a topic and to provide to the at least one second participant an invitation to join the collaborative communication event. The one or more processors further execute instructions to receive, from any one of the first participant and the at least one second participant, a document, and providing the document to all participants for view and/or editing and provide the document to all participants upon request within a selected period of time. The one or more processors further execute instructions to asynchronously grant access to the collaborative communication event to at least one third participant, permit the at least one third participant to access and modify the document in the collaborative communication event, and receive a request from the at least one third participant to switch a third client device used by the at least one third participant to continue to participate in the collaborative communication event.

According to one embodiment, a non-transitory, machine readable medium is described that includes instructions, which when executed by one or more processors, cause a computer to perform a method for receiving, from a first participant having access to a first client device, a request for starting a collaborative communication event including at least one second participant and a topic, providing to the at least one second participant an invitation to join the collaborative communication event, and receiving, from any one of the first participant and the at least one second participant, a document, and providing the document to all participants for view and/or editing. The method includes providing the document to all participants upon request within a selected period of time, asynchronously granting access to the collaborative communication event to at least one third participant, and permitting the at least one third participant to access and modify the document in the collaborative communication event. The method also includes receiving a request from the at least one third participant to switch a third client device used by the at least one third participant to continue to participate in the collaborative communication event.

In yet another embodiment, a system is described that includes a means for storing commands and a means for executing the commands causing the system to perform a method including receiving, from a first participant having access to a first client device, a request for starting a collaborative communication event including at least one second participant and a topic, providing to the at least one second participant an invitation to join the collaborative communication event, and receiving, from any one of the first participant and the at least one second participant, a document, and providing the document to all participants for view and/or editing. The means for executing the commands further causes the system to perform providing the document to all participants upon request within a selected period of time, asynchronously granting access to the collaborative communication event to at least one third participant, and permitting the at least one third participant to access and modify the document in the collaborative communication event. The means for executing the commands further causes the system to perform receiving a request from the at least one third participant to switch a third client device used by the at least one third participant to continue to participate in the collaborative communication event.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
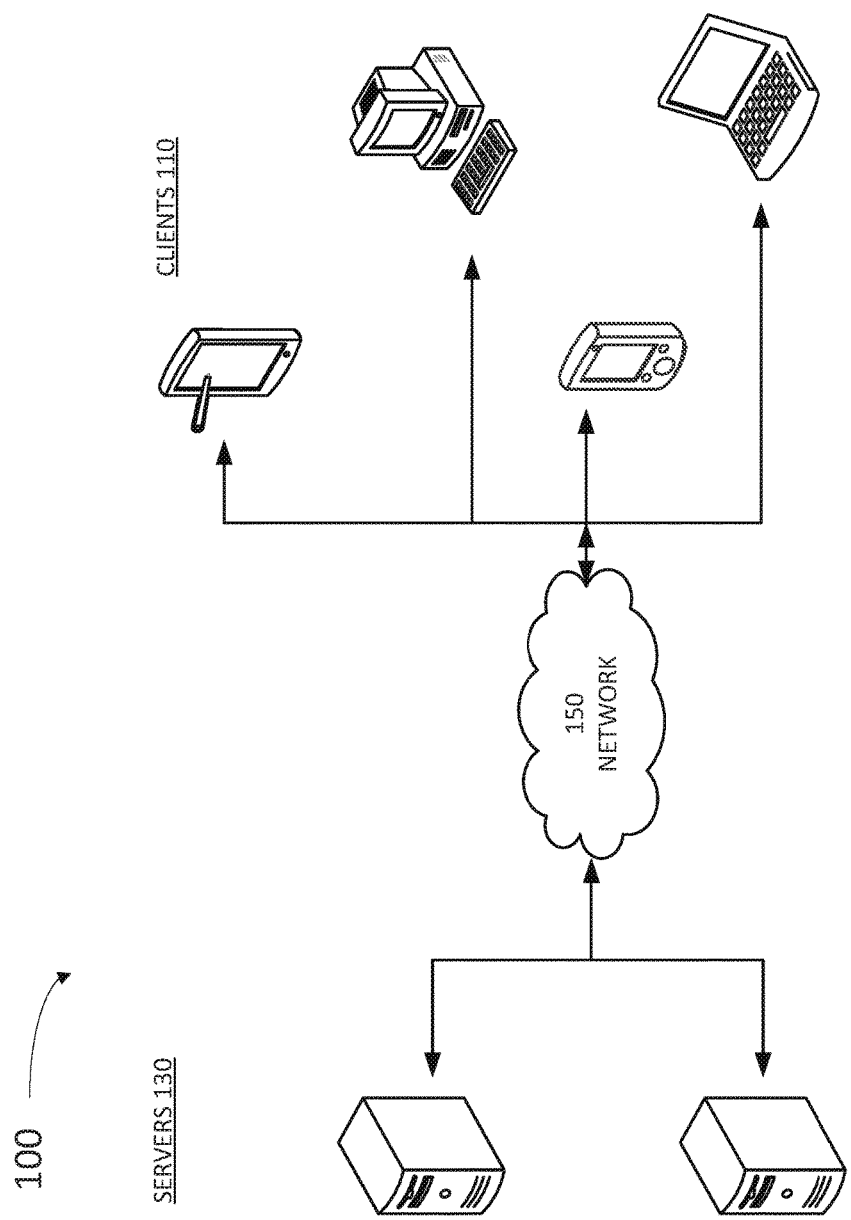
FIG. 1 illustrates an example architecture suitable to provide a platform for a collaborative communication event, according to some embodiments.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

General Overview

A problem that arises in the realm of social networking through mobile computer devices, especially during collaborative communication events, is that for a given modality of interaction (sharing a document, participating in a whiteboard), there is a need to previously log in and schedule the use of a given tool or application through a remote server. For example, when a document sharing application is desired, participants in the collaborative communication event may need to register previously with the server that provides the desired service. In some embodiments, documents shared in the document sharing application may include a text-rich document such as a Word document, a PDF document, or any other document accessible through a text editing application, including a computer code sequence, and the like), a spreadsheet document (e.g., Excel and the like), a presentation document (e.g., Power Point and the like), an extensible markup language (XML) file, a hypertext markup language (HTML) file, or a multi-media file such as a video, audio, image file, or any combination of the above.

Accordingly, once the collaborative communication event is started, it is difficult to request a new application or a new sharing experience, unless this has been scheduled in advance. This limits severely the versatility of the networking platform, and frustrates users who find their communication curtailed by unnecessary access protocols and rules.

The disclosed system addresses the problem specifically arising in the realm of computer technology by providing a solution also rooted in computer technology, namely, by considering enhanced networking capabilities in a server to bridge the gaps between all of the modalities of modern communication being Voice (VoIP and PSTN), Video, Chat, and Content Sharing. Embodiments as disclosed herein include collaborative networking experiences that combine synchronous collaboration and asynchronous collaboration, transcending multiple types of communication platforms. Accordingly, the disclosed system provides a flexible tool for entrepreneurs to share creative ideas regardless of the specific circumstances of any one individual participating in a conversation.

Embodiments as disclosed herein prioritize for a user the selection of attendees for a given collaborative communication event rather than requesting the user to know in advance the sharing tools that may be selected during the collaborative communication event. Once a session is open, the sharing tools are available within the disclosed platform so that no special resources need to be reserved or scheduled (e.g., document sharing and editing, whiteboard access, video, and the like). Accordingly, embodiments as disclosed herein emphasize the participants selected for a topic rather than the specific tools to be used (whiteboard, screen share, document editor sharing, and the like).

Example System Architecture

FIG. 1 illustrates an example architecture 100 suitable to provide a platform for a collaborative communication event, according to some embodiments. Architecture 100 includes servers 130 and clients 110 connected over a network 150. One of the many servers 130 is configured to host a memory including instructions which, when executed by a processor, cause server 130 to perform at least some of the steps in methods as disclosed herein. In some embodiments, the processor in server 130 is configured to host a collaborative communication event that a participant may access through client device 110. Further, in some embodiments, the processor in server 130 is configured to provide documents including images, video and text messaging services to a participant in a collaborative communication event through client device 110. In some embodiments, the documents provided by server 130 to one or more participants may include an application-based document (e.g., a text-rich document such as a Word document, a PDF document, or any other document accessible through a text editing application, including a computer code sequence, and the like), a spreadsheet document (e.g., Excel and the like), a presentation document (e.g., Power Point and the like), an XML file, a HTML file, a multi-media file such as a video, audio, image file, or any combination of the above. Information related to, and instructions to handle the collaborative communication event may be stored in a collaborative communication event engine 242 accessible by a participant through a client device 110 (e.g., accessible through a web page or an application 222 running on client device 110). Servers 130 can return images, documents, rich-text documents and the like intended for a shared use and modification by multiple participants in a collaborative communication event. For purposes of load balancing, multiple servers 130 can host memories including instructions to one or more processors and multiple servers 130 for hosting one or more collaborative communication events as disclosed herein.

Servers 130 may include any device having an appropriate processor, memory, and communications capability for hosting the documents and applications associated with collaborative communication event engine 242. Collaborative communication event engine 242, may be accessible by multiple participants through various client devices 110 over the network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing collaborative communication event engine 242 on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
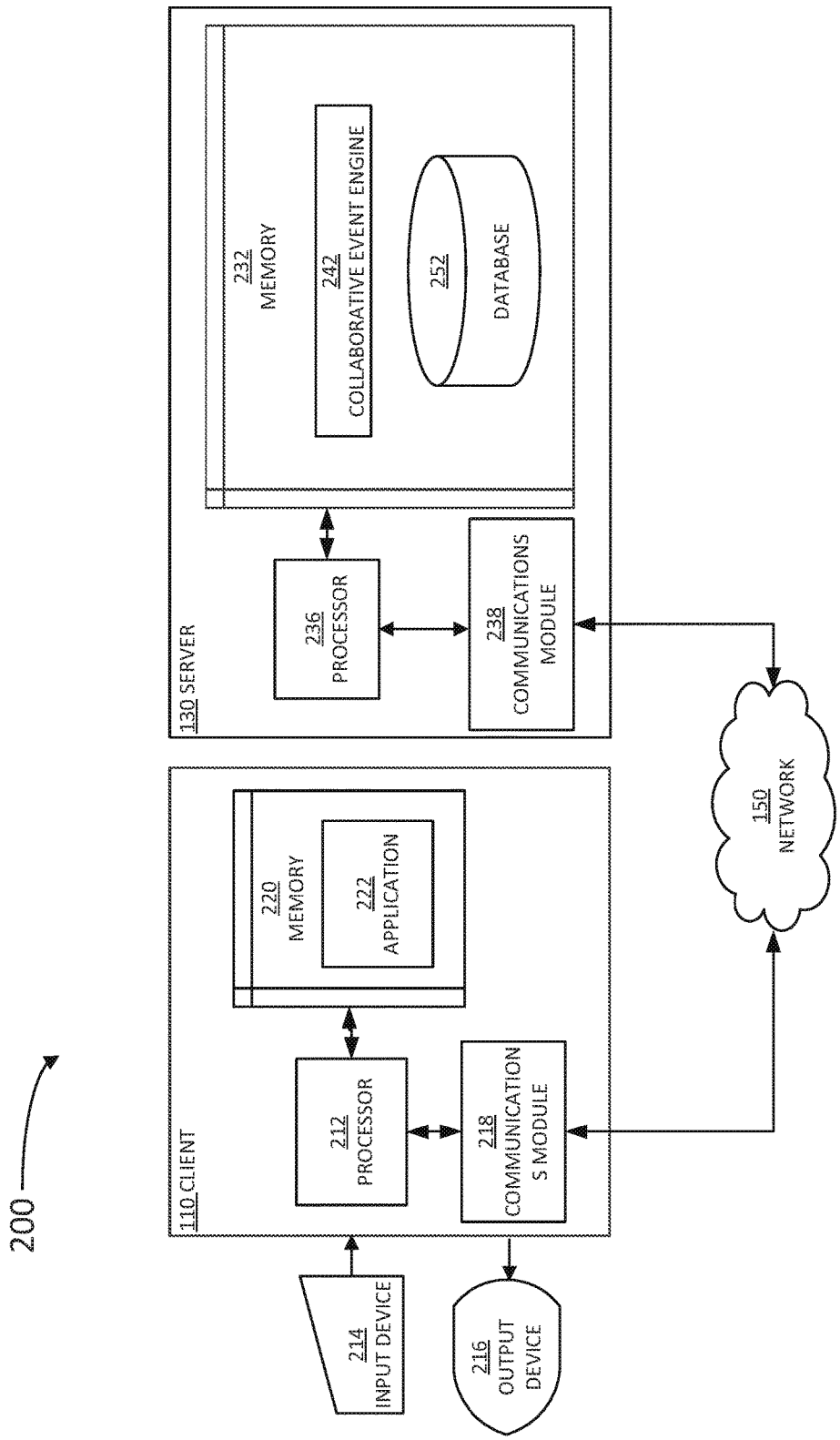
FIG. 2 is a block diagram illustrating an example server and client from the architecture of FIG. 1 according to certain aspects of the disclosure.

FIG. 2 is a block diagram 200 illustrating an example server 130 and client device 110 in the architecture 100 of FIG. 1 according to certain aspects of the disclosure. Client device 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Client device 110 may be any one of a desktop computer, a laptop, or a mobile computing device. Client device 110 may include a processor 212 and a memory 220. An input device 214 and an output device 216 enable the user to interact with client device 110. Examples of input device 214 and output device 216 may include a mouse, a keyboard, a display, a touch-interactive display, and the like.

Server 130 includes a memory 232, a processor 236, and communications module 238. The user interface is displayed for the user in an output device 216 of client device 110. Memory 232 includes a collaborative communication event engine 242 and a database 252. Collaborative communication event engine 242 includes instructions which, when executed by processor 236, cause server 130 to perform at least partially steps as disclosed herein. For example, collaborative communication event engine 242 includes instructions to communicate with application 222 to incorporate the user of client device 110 into a collaborative communication event as disclosed herein. Collaborative communication event engine 242 may also include instructions to store a history log and other data related to a collaborative communication event as disclosed herein into database 252. Furthermore, in some embodiments collaborative communication event engine 242 may include instructions to retrieve at least some of the data in database 252 and provide to one or more participants in a collaborative communication event as disclosed herein.

In some embodiments, collaborative communication event engine 242 stores data in and maintains for a selected period of time, database 252. Further, collaborative communication event engine 242 updates different changes and modifications on a document or file discussed during the collaborative communication event, as part of a chat/topic history, as stored in database 252. In some embodiments, the activity, notes, and other actions taken by different participants over a document or any other topic item are displayed around the item, showing the specific participant that has participated in the activity. As mentioned above the document stored by server 130 in database 242 may include an application-based document (e.g., a text-rich document such as a Word, document, a PDF document, or any other document accessible through a text editing application, including a computer code sequence, and the like), a spreadsheet document (e.g., Excel and the like), a presentation document (e.g., Power Point and the like), an XML file, an HTML file or a multi-media file such as a video, audio, image file, or any combination of the above.

The user may access collaborative communication event engine 242 through application 222 installed in memory 220 of client device 110. The user may also access collaborative communication event engine 242 via a web browser installed in client device 110. Execution of application 222 may be controlled by a processor 212 in client device 110. In some embodiments, application 222 is downloaded and installed by the user into client device 110, from server 130.

Processor 236 is configured to execute instructions, such as instructions physically coded into processor 236, instructions received from software in memory 232, or a combination of both. A user of client device 110 may use input device 214 to submit a document or a media file to collaborative communication event engine 242 via a user interface of application 222. The document submitted by the user may be include an application-based document (e.g., a text-rich document such as a Word, document, a PDF document, or any other document accessible through a text editing application, including a computer code sequence, and the like), a spreadsheet document (e.g., Excel and the like), a presentation document (e.g., Power Point and the like), an XML file, an HTML file or a multi-media file such as a video, audio, image file, or any combination of the above.

Figure 3:
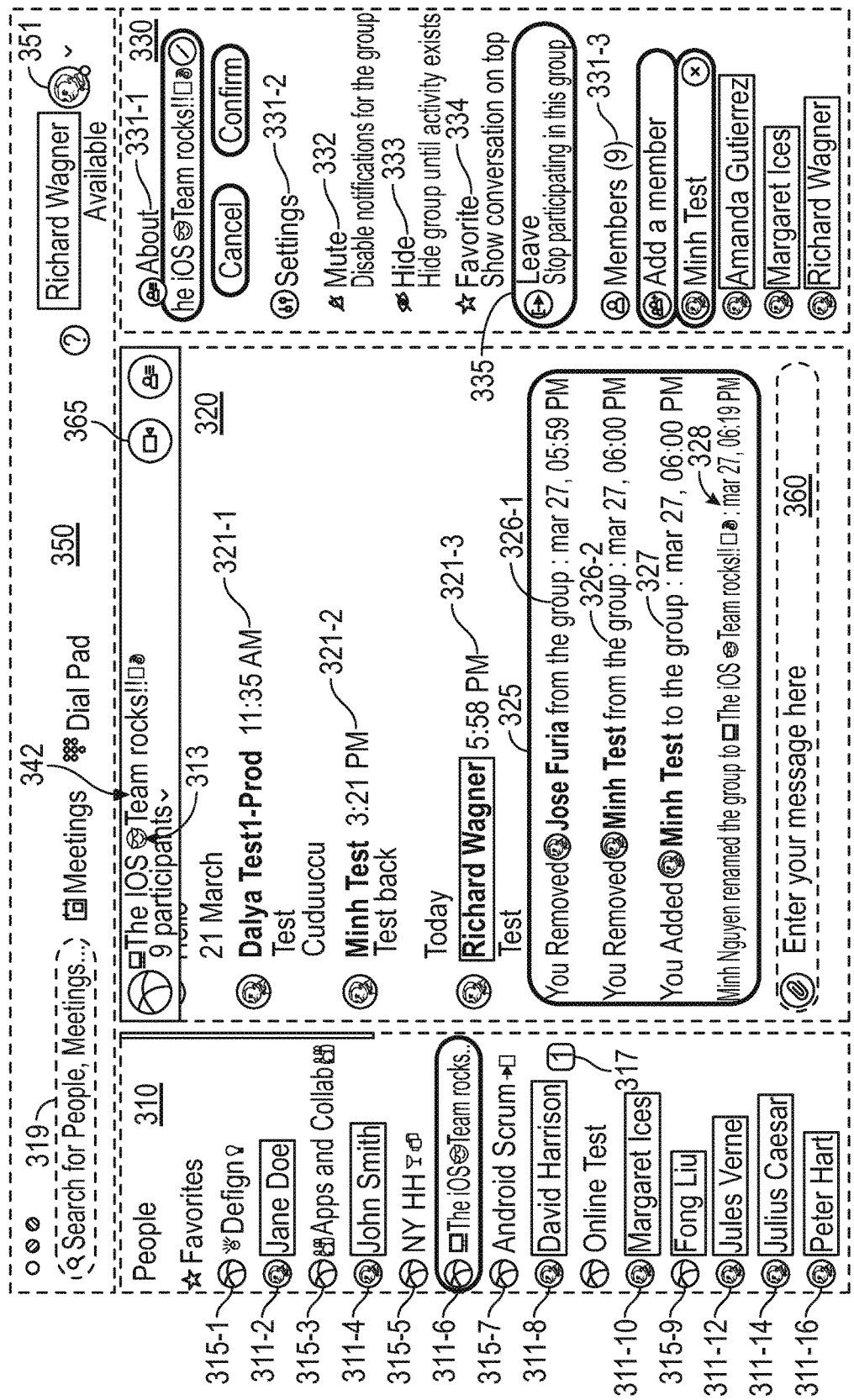
FIG. 3 illustrates a screen-shot of a display in a system to facilitate virtual collaboration between a selected group of participants, according to some embodiments.

FIG. 3 illustrates a screen-shot of a display 300 in a system to facilitate virtual collaboration between a selected group of participants in a collaborative communication event 342, according to some embodiments. Display 300 may be provided to client device 110 (e.g., output device 216) used by any one of the participants in the collaborative communication event. In some embodiments, display 300 is similar for each of multiple devices 110 used by the different participants. In some embodiments, the nature and content of display 300 may be determined by the capabilities of client device 110 from each participant. Display 300 includes a listing 310, a central field 320 displaying details of collaborative communication event 342, a profile field 330, and a task bar 350. In some embodiments, the name (e.g., "topic") of collaborative communication event 342 may include at least one emoji 313. Task bar 350 may indicate the user name and avatar 351 of the user accessing server 130 through application 222.

In general a collaborative communication event may include a group of participants that are focused on a "topic" or "subject." The group of participants may be fluid, but the historical content of the collaborative communication event is available and private to anyone in the group or new to the group. The collaborative communication event may include content, participants, meetings, calls, chats, links, rich-live content, and the like. What could start in a real-time video or audio meeting can continue synchronously or asynchronously across a variety of modalities and devices (e.g., desktop, mobile, web, room).

Listing 310 in the left column of display 300 includes the subscribers 311-2, 311-4, 311-6, 311-8, 311-10, 311-12, 311-14, and 311-16 (hereinafter, collectively referred to as "subscribers 311") of a network of server 130. Accordingly, some subscribers 311 may be participants 321-1 through 321-3 (hereinafter, collectively referred to as "participants 321"). Moreover, some subscribers 311 may not be participants of collaborative communication event 342. Also listed in the left column are past collaborative communication events 315-1, 315-3, 315-5, 315-7, and 315-9 (hereinafter, collectively referred to as "past events 315"). In some embodiments, the system may associate a color to collaborative communication events 315 based on topic analysis. In some embodiments, a flag 317 may indicate a message or an edit performed by a given person or within a specific topic (e.g., a participant asynchronously modifies a document in collaborative communication event 342). In some embodiments, task bar 350 includes a search tab 319 to allow a user to look for potential participants to invite to collaborative communication event 342.

Central field 320 shows a chronological history of collaborative communication event 342. Accordingly, central field 320 may include a section 325 listing removed participants 326-1, 326-2 (hereinafter, collectively referred to as "removed participants 326"), and added participant 327. In some embodiments, collaborative communication event engine 242 assigns automatically a topic avatar as a differentiator for collaborative communication event 342. In some embodiments, avatar 351 for a given participant indicates a participant's activity. Collaborative communication event engine 242 may provide access to a live record of the collaboration content created or modified during a chat, conversation or meeting in central field 320. For example, central field 320 may display an action 328 by a participant such as a renaming of the collaborative communication event 342. In some embodiments, a title for collaborative communication event 342 may be unique or may be modified anytime by either one of participants 321, or by a participant 321 that has selected permissions. For example, a participant 321 that initiates collaborative communication event 342 (e.g., the "first" participant), may have initiator privileges that enable it to rename the topic at any point in time. In some embodiments, collaborative communication event engine 242 may include a dynamic topic title changing based on events, which may be automatically performed by collaborative communication event engine 242. In such scenario, one or more participants 321 may be authorized to override or modify the automatic title change. Embodiments as disclosed herein enable the addition of content, and layer multiple collaborations chronologically over the added content (e.g., on central field 320). In some embodiments, certain participants may have privileges for taking actions (e.g., "renaming," and the like) over other participants, according to settings listed in profile field 330.

Profile field 330 displays the profile 331-1, settings 331-2, and members 331-3 of collaborative communication event 342. Settings 331-2 may include actions such as "hide" (332) "mute" (333), "favorite" (334), "leave" (335) and other details about the participants and some of their prior interactions during collaborative communication event 342. In some embodiments, the first participant may leave the event at any point, without necessarily canceling or closing the event. Further actions that participant 321 may select from profile field 330 include removing collaborative communication event 342 or past event 315 altogether, or an entry item from collaborative communication event 342 or past event 315 (e.g., from a history log of previous or current topics).

In some embodiments, display 300 may enable any one participant 321 to see in real time (e.g., in central field 320) what participant 321 is viewing or modifying a specific content shared during collaborative communication event 342 within synchronous or asynchronous communication. Accordingly, some embodiments generate and store (e.g., in database 252) a visual record of what participant 321 was sharing a document, at what time, and for how long. Further, some embodiments include an indication of what participant 321 is currently viewing a document or file that has been shared in the past. Embodiments as disclosed herein provide the ability for each of participants 321 to collaborate on content while using a messaging tool 360 associated with the topic, in parallel. Further, during the collaborative communication event, in some embodiments participants 321 are able to see other participants 321 that may be actively editing notes as part of a meeting (synchronously), or asynchronously, after a meeting has ended.

In some embodiments, collaborative communication event engine 242 may provide auto-detection of open questions and items according to exchanged comments, files and data, during collaborative communication event 342. Further, in some embodiments, collaborative communication event engine 242 may provide and/or promote valuable answers to multiple participants 321 in a chat group.

Embodiments as disclosed herein further provide rich meeting notifications for collaborative communication event 342. Rich meeting notifications may include real-time information about attendees (e.g., location, status, modalities: on mute, on video sharing, and the like). Further, some embodiments include auto-detection of dates and times in conversations to appear in the receiver time-zone. For example, when a new meeting is scheduled, the dates and times may be automatically re-adjusted according to each participant's location.

Further, in some embodiments, collaborative communication event engine 242 provides animations in topic names based on content, events or reminders. Further, some embodiments may include rich, actionable mentions of participants, documents, and other collaborative communication events (past events 315 or currently active events). For example, a rich, actionable mention may include sharing an external reference (e.g., a PDF document, a text-rich document, an XML document, an HTML document, a video, an image file, an audio file or an audio feed, a web-shot, an internet address, a universal resource locator—URL—, and the like). In some embodiments, collaborative communication event engine 242 provides to each participant 321 the capability for adding a comment (arrow, marker, or highlight) within the document, without the need to open and load the specific application executing the document (e.g., Adobe®, Word®, Power Point® and the like).

Other capabilities that may be displayed in central panel 320 include video sharing 365. Video sharing 365 may include live webcast or multi-casting. In some embodiments, up to 10, 20 or 100 participants 321 may share video streaming (e.g., show in real time a webcam feed) and intelligently select which video feeds should be broadcasted to more efficiently use bandwidth limitations. Collaborative communication event engine 242 provides video or multimedia feeds to different users based on the specific capabilities of client device 110. Accordingly, in some embodiments collaborative communication event engine 242 performs intelligent notification routing, wherein only capable participants 321 are notified, based on the configuration and settings of each client device 110. Accordingly, in some embodiments collaborative communication event engine 242 provides customizable notifications and smart featuring before pushing notifications to different users and different devices.

In some embodiments, collaborative communication event engine 242 informs a participant 321when it is mentioned in a message or communication between at least two other participants 321. Further, in some embodiments a participant 321 may set up notification features (e.g., in profile field 330), e.g., to only receive notifications when a given participant 321 says about a given topic or sub-topic. Collaborative communication event engine 242 may also provide threaded conversations to organize a conversation within a collaborative communication event 342 (e.g., a broad topic) in sub-topic, participants 321 may ask questions, answer and collaborate on answers within short, one-line messages between fewer participants 321 than are in collaborative communication event 342. In some embodiments, collaborative communication event engine 242 may create a sub-topic or wiki reservoir of knowledge of a particular sub-topic, within collaborative communication event 342, so that a participant who asks a question may be automatically directed or counseled to the answer rather than sending a notification to everyone in the topic meeting.

Collaborative communication event engine 242 may also provide the capability to invite one or more external partners to collaborative communication event 342 as guests, to collaborate in a specific topic. In some embodiments, a guest can be given restricted access to files and history log of collaborative communication event 342 (e.g., within the context of a multi-enterprise collaboration). Accordingly, in some embodiments collaborative communication event engine 242 allows different collaborator types to have varying degrees of access and permissions in any given topic. For example, one or more collaborators may be allowed to post messages into a topic while having many "read-only" collaborators that have access to the documents and the topic log, but may not be able to modify or upload content.

In some embodiments, real-time threaded conversations within a topic may be automatically moved within the flow of the conversation, as comments are included in the thread. In some embodiments collaborative communication event engine 242 provides customizable notifications for meaningful activity within collaborative communication event 342 (e.g. mentions, shared content, and the like). Further, some embodiments aggregate the notifications in a global "notifications" feed that can be filtered by notification properties.

Figure 4:
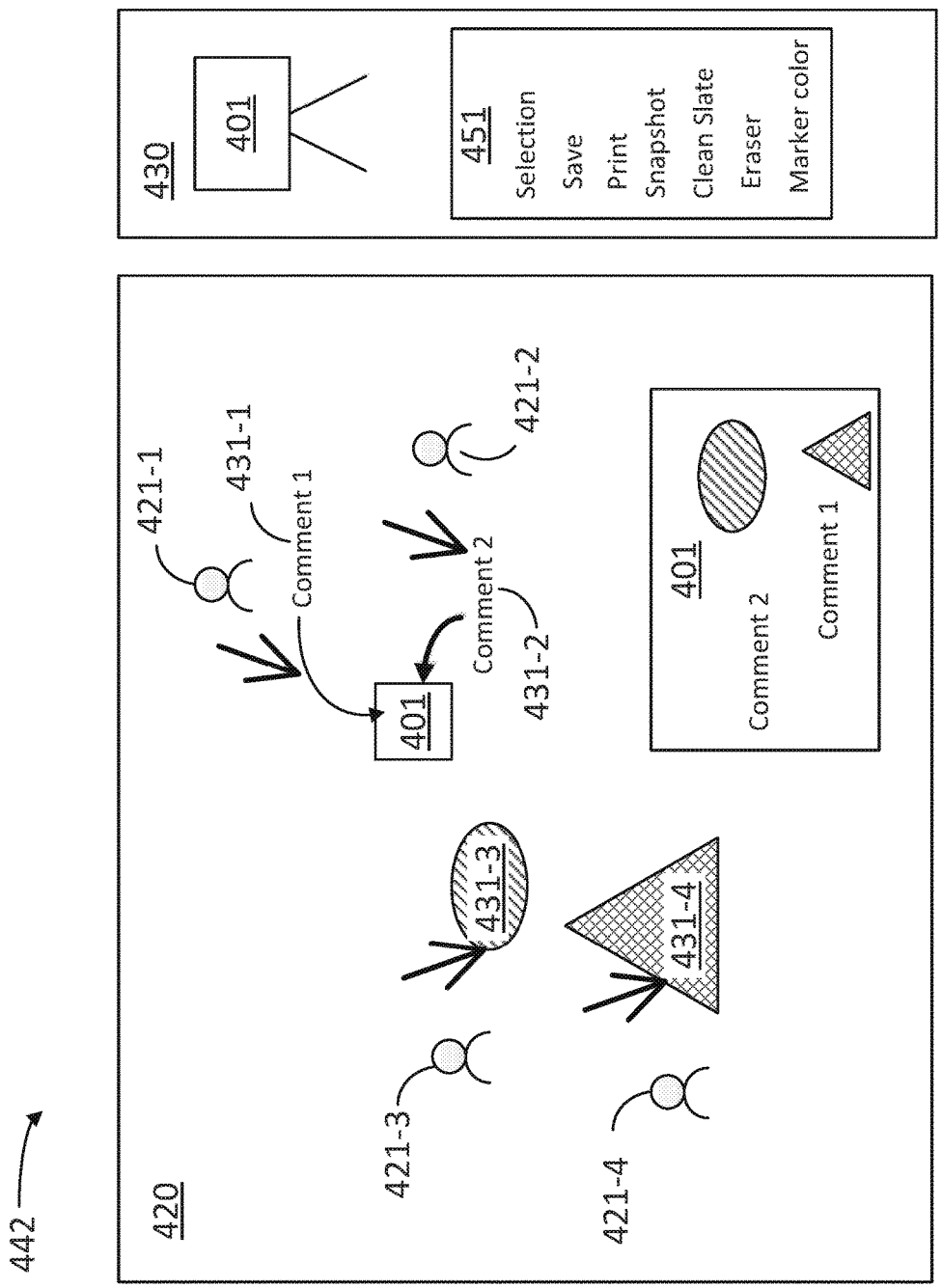
FIG. 4 illustrates a platform for collaborative communication events configured to provide a whiteboard application in a collaborative communication event, according to some embodiments.

FIG. 4 illustrates a collaborative communication event 442 including a whiteboard application 430 in a collaborative communication event, according to some embodiments. Accordingly, a field 420 displays participants 421-1, 421-2, 421-3, and 421-4 (hereinafter, collectively referred to as "participants 421") may each provide inputs 431-1, 431-2, 431-3, and 431-4 (hereinafter, collectively referred to as "inputs 431"), respectively, to whiteboard 401, using toolbox 451. Inputs 431 may include textual representations (e.g., "comment 1" 431-1, and "comment 2" 431-2), or pictorial, diagrammatic representations (e.g., "ellipse" 431-3 and "triangle" 431-4).

In some embodiments, collaborative communication event engine 242 provides a whiteboard application 430 directly executed from collaborative communication event 442 without the need to launch a third party application, or allocate special server resources to create a new session. Whiteboard application 430 may enable participants 421 to collaborate and edit a pictorial representation of the collaborative communication event, on whiteboard 401. Collaborative communication event engine 242 may further store one or multiple images associated with whiteboard 401 and make each of the multiple images available to one or more participants 421. Thus, in some embodiments the accessibility to multiple presentation resources is direct and immediate for participants 421, regardless of the communication platform of each and without the need to relaunch an application or request permissions and availability.

Figure 5:
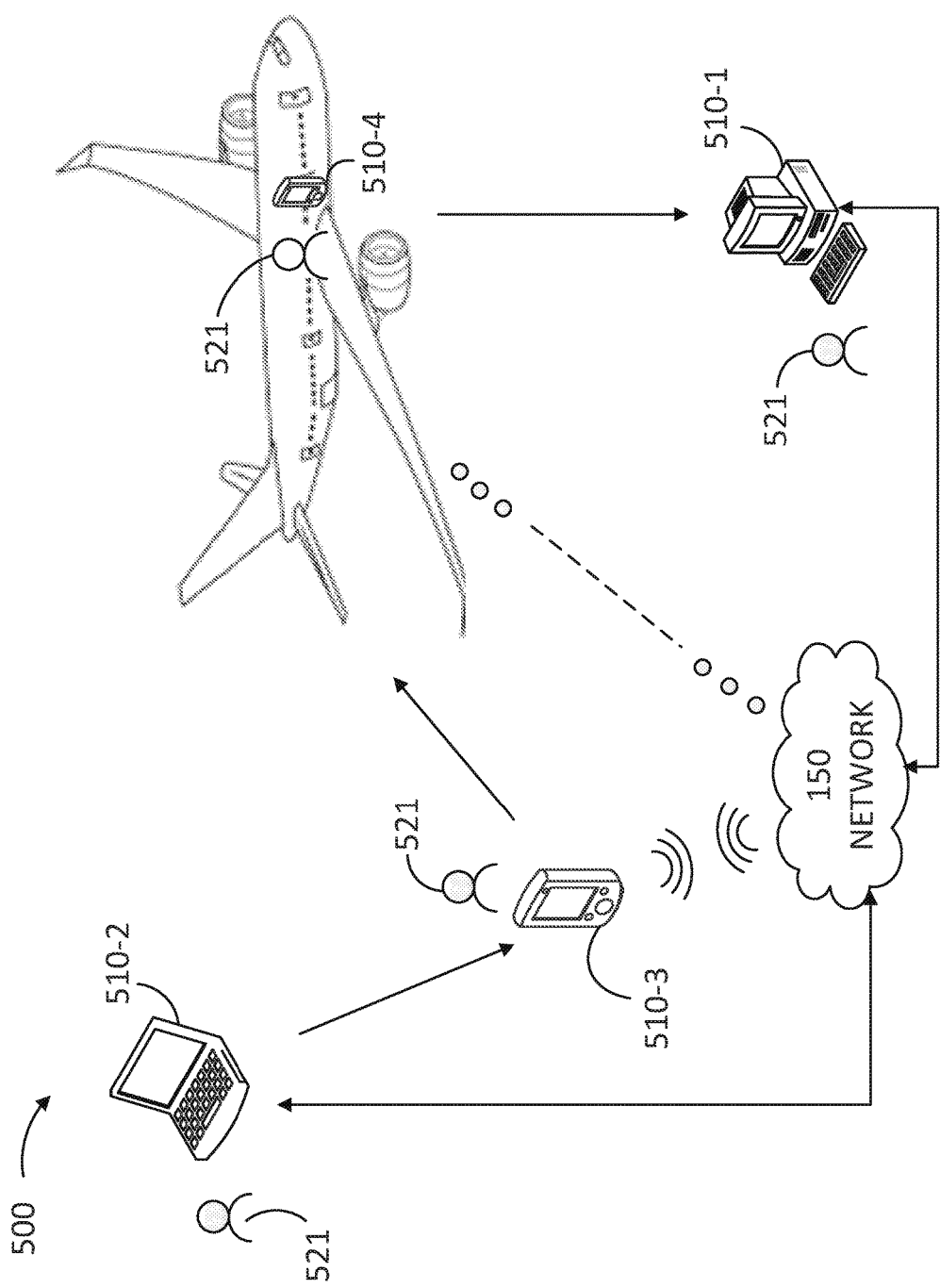
FIG. 5 is a walkthrough illustration of a platform for collaborative communication events wherein at least one user hops through multiple client devices in different communication modes, according to some embodiments.

FIG. 5 illustrates a platform 500 for collaborative communication events wherein a participant 521 hops through multiple client devices 510-1 (desktop computer), 510-2 (laptop computer), 510-3 (smartphone), and 510-4 (airborne smartphone), hereinafter collectively referred to as "client devices 510," in different communication modes, according to some embodiments.

Collaborative communication event engine 242 provides several advantages, including efficient communication through synchronous and asynchronous events associated with a collaborative communication event that groups multiple participants 521. Collaborative communication event engine 242 provides a tool for each participant 521 to dynamically adjust their status during a collaborative communication event, and transparently switch between different communication modalities. For example, participant 521 may have different bandwidth and capacity to access network 150 when using desktop 510-1 as compared to using smartphone 510-3. Further, using smartphone 510-3 with a cellular network access to network 150 may have different capabilities than using the same smartphone 510-4 in an airplane. Thus, collaborative communication event engine 242 may provide data, privileges, and other capabilities to participant 521 according to individual circumstances such as network availability, bandwidth, and individual device capabilities. Accordingly, the proposed solution further provides improvements to the functioning of a computer itself because it prevents locking or overwhelming the computational resources of a participant's device.

Figure 6:
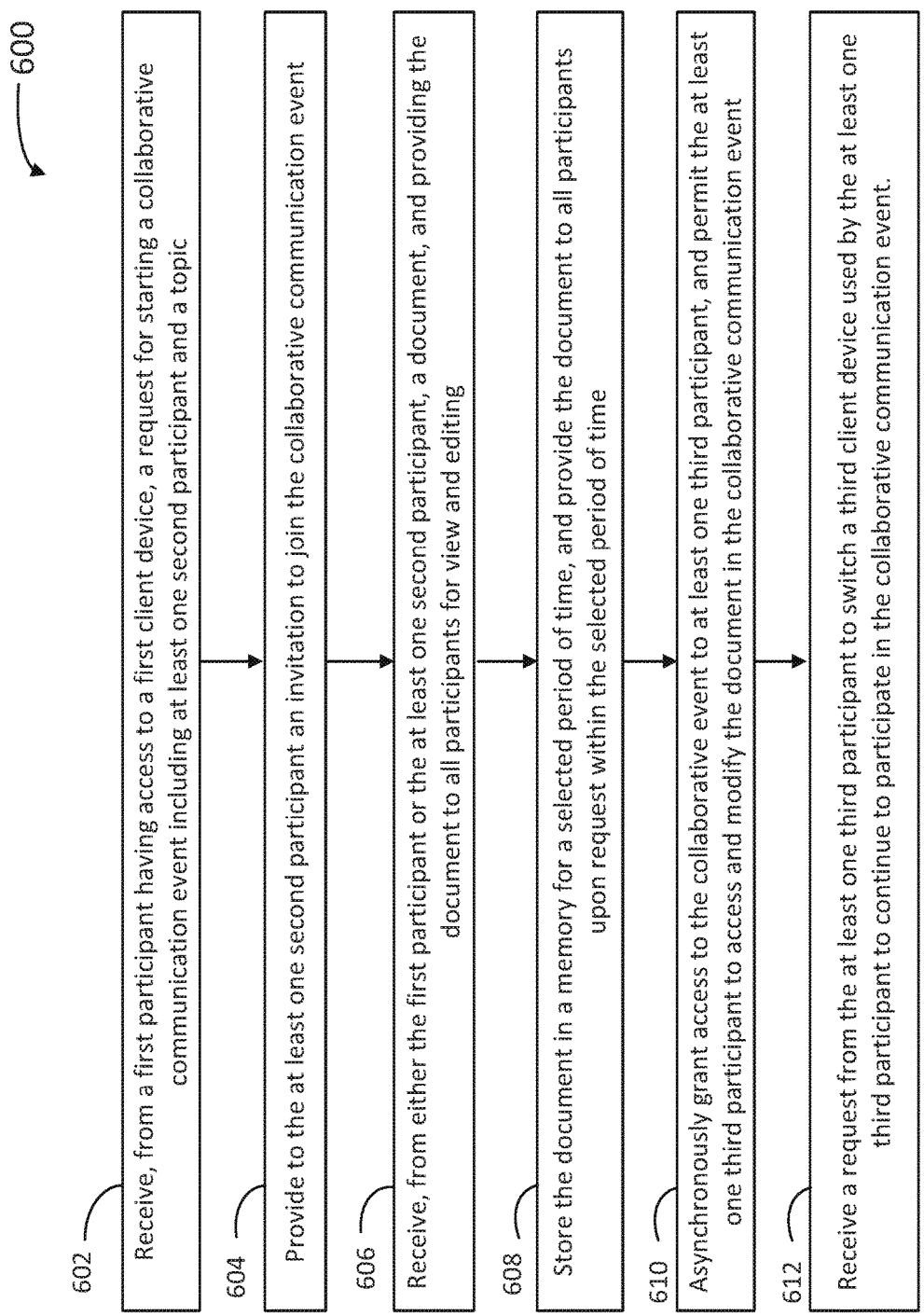
FIG. 6 is a flowchart illustrating steps in a method for hosting a collaborative communication event in a server, according to some embodiments.

FIG. 6 is a flowchart illustrating steps in a method 600 for hosting a collaborative communication event in a server, according to some embodiments. Method 600 may be performed at least partially by any one of the network servers hosting a collaborative communication event engine (e.g., collaborative communication event engine 242), while communicating with any one of a plurality of client devices (e.g., servers 130 and clients 110). At least some of the steps in method 600 may be performed by a computer having a processor executing commands stored in a memory of the computer (e.g., processors 212 and 236, memories 220 and 232). For example, at least some of the commands may be included in an application installed in a client device accessible by a user (e.g., application 222). Further, steps as disclosed in method 600 may include retrieving, editing, and/or storing files in a database that is part of, or is communicably coupled to, the computer (e.g., database 252). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes receiving, from a first participant having access to a first client device, a request for starting a collaborative communication event including a second participant and a topic.

Step 604 includes providing to the at least one second participant an invitation to join the collaborative communication event. In some embodiments, step 604 includes providing a universal resource location (URL) address for the collaborative communication event to the at least one second participant to the topic as a guest by providing a URL or a link to have access to the collaborative communication event, no re-invitation necessary, no password or user ID. In some embodiments, step 604 may further include revoking access to the at least one second participant upon a request by the first participant. In some embodiments, step 604 may include providing a sub-topic notification between the first participant and the at least one second participant.

In some embodiments, step 604 includes providing a universal resource location address for the collaborative communication event to the at least one second participant.

Step 606 includes receiving, from either the first participant or the at least one second participant, a document, and providing the document to all participants in the collaborative communication event for viewing, editing, or otherwise modifying the document. In some embodiments, step 606 includes notifying the first participant of an action by the at least one second participant over the document: looking at a "pdf" file or viewing a file, and send a message: better look at something else, or there's something more interesting to see. In some embodiments, step 606 includes displaying only a relevant activity from users (e.g., high value in the conversation, only if more than a certain number of people are involved in the activity). In some embodiments, step 606 includes prioritizing or ranking participant activity so that high value activities have priority for being broadcasted (e.g., displayed to the at least one second or more participants through the corresponding client devices). In some embodiments, step 606 includes displaying, for the first participant and for the at least one second participant, a note pad including annotations to the document made by at least one of the first participant or the at least one second participant. In some embodiments, step 606 includes allowing at least one of the first participant or the at least one second participant access and display of the modification in real time or in a stored document. In some embodiments, step 606 includes receiving a video feed from the first participant and providing the video feed to the at least one second participant based on a configuration of the second client device.

Step 608 includes storing the document in a memory for a selected period of time, and providing the document to all participants in the collaborative communication event upon request within the selected period of time. In some embodiments, step 608 includes storing a history log of actions by the first participant and the at least one second participant during the collaborative communication event.

Step 610 includes asynchronously granting access to the collaborative communication event to at least one third participant, and permitting the at least one third participant to access and modify the document in the collaborative communication event. In some embodiments, step 610 may include granting the access hours, days, weeks or even months after the collaborative communication event started.

Step 612 includes receiving a request from one of the first, second, or third participants to switch one of the first client device, a second client device used by the at least one second participant, or a third client device used by the at least one third participant to continue to participate in the collaborative communication event.

Figure 7:
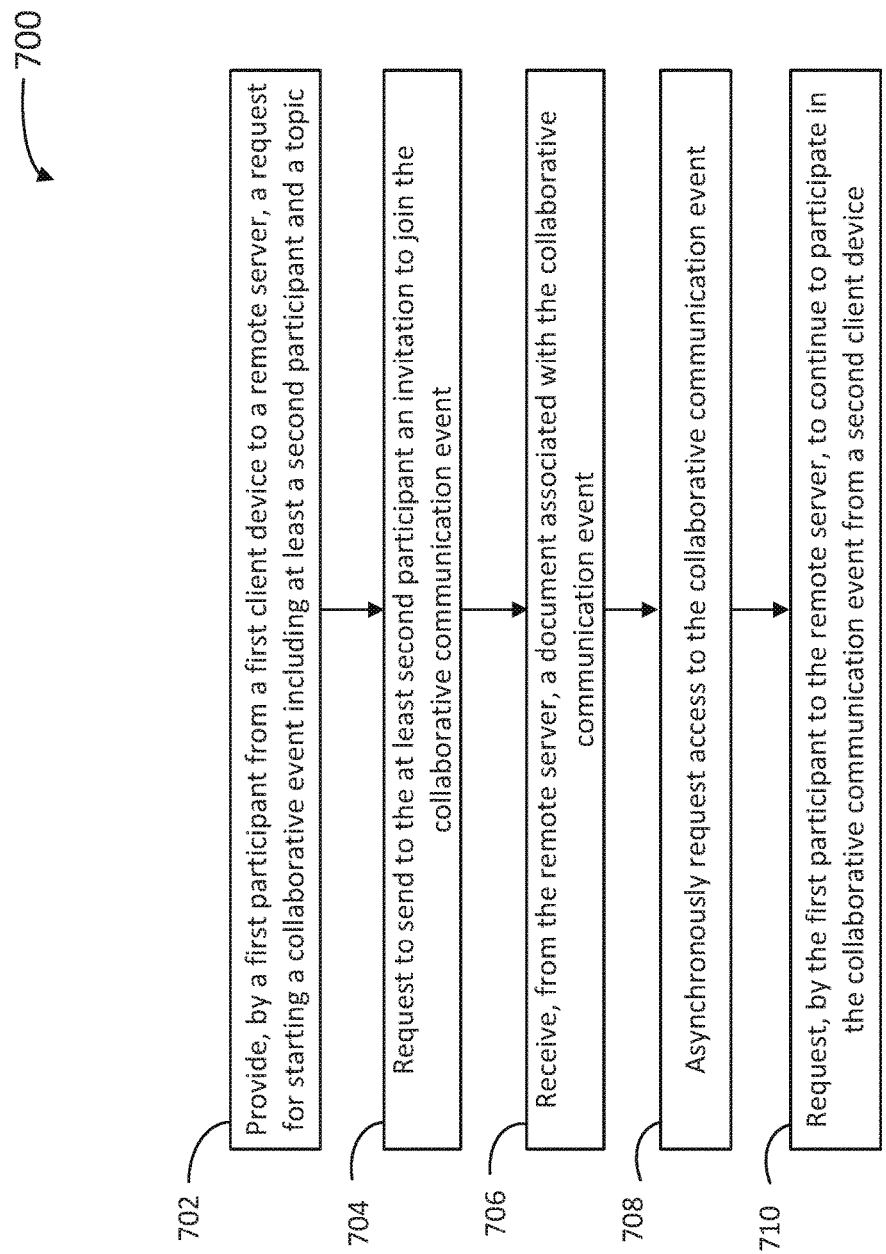
FIG. 7 is a flowchart illustrating steps in a method for participating in a collaborative communication event in a server, according to some embodiments.

FIG. 7 is a flowchart illustrating steps in a method for participating in a collaborative communication event in a server, according to some embodiments. Method 700 may be performed at least partially by any one of the network servers hosting a collaborative communication event engine (e.g., collaborative communication event engine 242), while communicating with any one of a plurality of client devices (e.g., servers 130 and clients 110). At least some of the steps in method 700 may be performed by a computer having a processor executing commands stored in a memory of the computer (e.g., processors 212 and 236, memories 220 and 232). For example, at least some of the commands may be included in an application installed in a client device accessible by a user (e.g., application 222). Further, steps as disclosed in method 700 may include retrieving, editing, and/or storing files in a database that is part of, or is communicably coupled to, the computer (e.g., database 252). Methods consistent with the present disclosure may include at least some, but not all, of the steps illustrated in method 700, performed in a different sequence. Furthermore, methods consistent with the present disclosure may include at least two or more steps as in method 700 performed overlapping in time, or almost simultaneously.

Step 702 includes providing, by a first participant from a first client device, to a remote server, a request for starting a collaborative communication event including at least one second participant and a topic.

Step 704 includes requesting to send to the at least one second participant an invitation to join the collaborative communication event.

Step 706 includes receiving, from the remote server, a document associated with the collaborative communication event.

Step 708 includes asynchronously requesting access to the collaborative communication event.

Step 710 includes requesting, by the first participant, to the remote server, to continue to participate in the collaborative communication event from a second client device.

Hardware Overview

Figure 8:
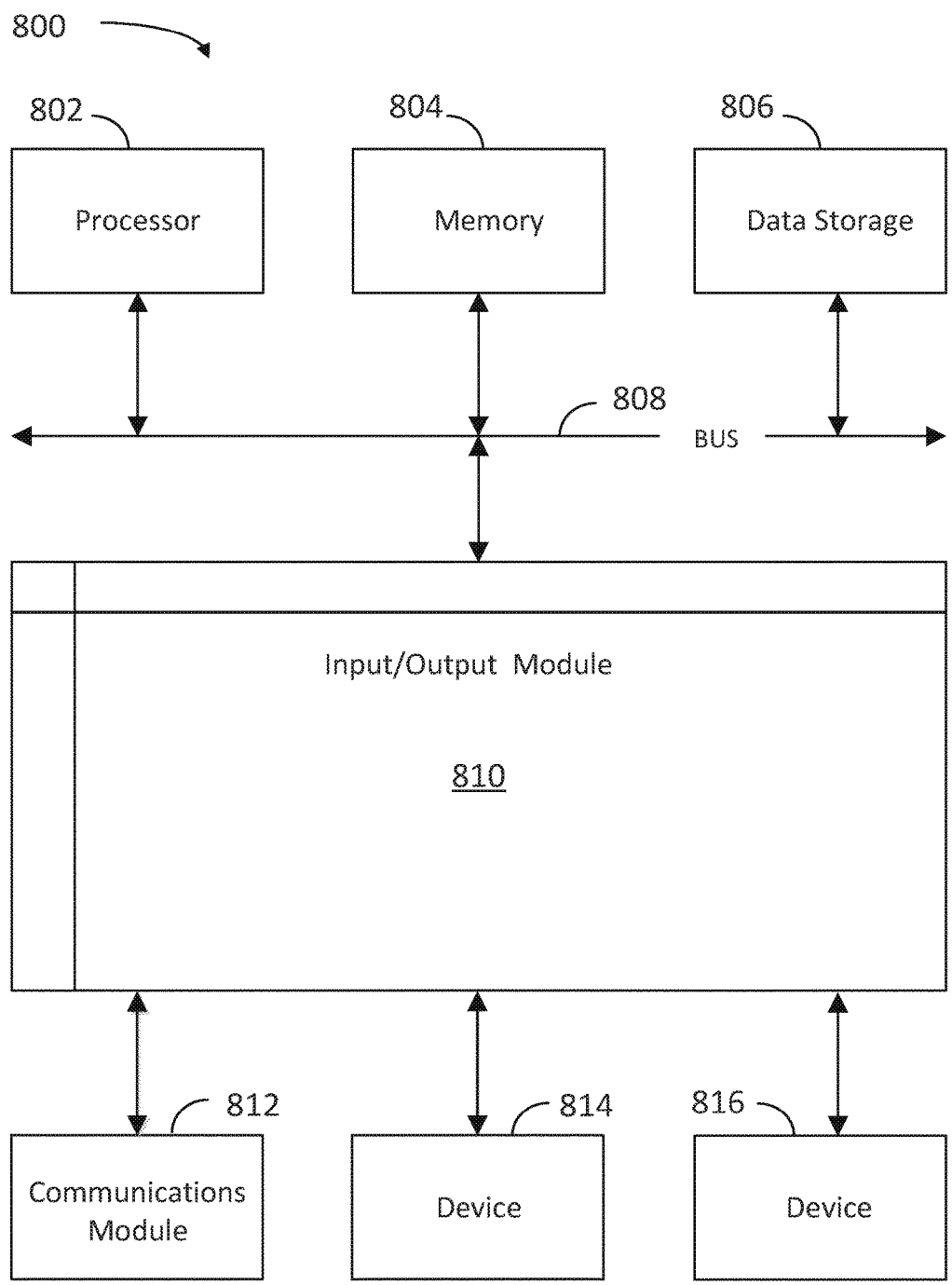
FIG. 8 is a block diagram illustrating an example computer system with which the client and server of FIGS. 1 and 2, and the methods of FIGS. 6 and 7 can be implemented, according to some embodiments.

FIG. 8 is a block diagram illustrating an exemplary computer system 800 with which the client device 110 and server 130 of FIGS. 1 and 2, and the methods of FIGS. 6 and 7 can be implemented. In certain aspects, the computer system 800 may be implemented using hardware or a combination of software and hardware, either in a dedicated server, or integrated into another entity, or distributed across multiple entities.

Computer system 800 (e.g., client device 110 and server 130) includes a bus 808 or other communication mechanism for communicating information, and a processor 802 (e.g., processors 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, a code that creates an execution environment for the computer program in question, e.g., code that constitutes processor firmware, a protocol stack, a database management system, an operating system, or a combination of one or more of them stored in an included memory 804 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, a special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as a LCD (liquid crystal display) monitor, for displaying information to the user.

According to one aspect of the present disclosure, the client device 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship with each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
receiving, from a first participant having access to a first client device, a request for starting a collaborative communication event including at least one second participant and a topic;
providing to the at least one second participant an invitation to join the collaborative communication event;
receiving, from any one of the first participant and the at least one second participant having access to a second client device, a document, and providing the document to all participants for view and/or editing;
providing the document to all participants upon request within a selected period of time;
asynchronously granting access to the collaborative communication event to at least one third participant, and permitting the at least one third participant to access the document in the collaborative communication event;
receiving a request from the at least one third participant to switch a third client device used by the at least one third participant to continue to participate in the collaborative communication event;
storing the document in a memory for a second selected period of time, and storing in the memory a history log of actions by the first participant and the at least one second participant during the collaborative communication event; and
receiving a video feed from the first participant and providing the video feed to the second participant based on a configuration of the second client device, wherein the video feed is part of a rich actionable mention of the document by the first participant, and actionable by the second participant.

2. The computer-implemented method of claim 1, wherein the one of the first, second, or third participants switches devices and continues to participate in the collaborative communication event, further comprising adjusting a configuration setting for the one of the first, second, or third participants who switches devices in the collaborative communication event based on a capability of the first client device, the second client device, or the third client device.

3. The computer-implemented method of claim 1, wherein the collaborative communication event comprises text, video, or audio communication that is configured to be enabled between at least two of the first client device, the second client device, and the third client device.

4. The computer-implemented method of claim 1, further comprising notifying the first participant of an action by the at least one second participant over the document.

5. The computer-implemented method of claim 1, further comprising displaying, for the first participant and for the at least one second participant, a note pad comprising annotations to the document made by at least one of the first participant or the at least one second participant.

6. The computer-implemented method of claim 1, further comprising revoking access to the at least one second participant upon a request by the first participant.

7. The computer-implemented method of claim 1, further comprising providing a sub-topic notification between the first participant and the at least one second participant.

8. The computer-implemented method of claim 1, wherein providing the document to all participants for view and/or editing comprises executing a proxy application for a document platform in a server.

9. A system comprising:
one or more processors; and
a memory coupled to the one or more processors, the memory including instructions that, when executed by the one or more processors, cause the one or more processors to:
receive, from a first participant having access to a first client device, a request for starting a collaborative communication event including at least one second participant having access to a second client device, and a topic;
provide to the at least one second participant an invitation to join the collaborative communication event;
receive, from any one of the first participant and the at least one second participant, a document, and providing the document to all participants for view and/or editing;
provide the document to all participants upon request within a selected period of time;
asynchronously grant access to the collaborative communication event to at least one third participant, and permit the at least one third participant to access and modify the document in the collaborative communication event;
receive a request from the at least one third participant to switch a third client device used by the at least one third participant to continue to participate in the collaborative communication event;
store the document in a memory for a second selected period of time, and storing in the memory a history log of actions by the first participant and the at least one second participant during the collaborative communication event; and
receive a video feed from the first participant and providing the video feed to the second participant based on a configuration of the second client device, wherein the video feed is part of a rich actionable mention of the document by the first participant, and actionable by the second participant.

10. The system of claim 9, wherein the one or more processors further executes instructions to adjust a configuration setting for the one of the first or second participants who switches devices in the collaborative communication event based on a capability of the first client device or the second client device.

11. The system of claim 9, wherein the one or more processors further executes instructions to enable text video and audio communication to at least one of the first client device the second client device, or the third client device.

12. The system of claim 9, wherein the one or more processors further executes instructions to display, for the first participant, for the at least one second participant, and for the at least one third participant, a note pad comprising annotations to the document made by at least one of the first participant, the at least one second participant, or the at least one third participant.

13. The system of claim 9, wherein the one or more processors further executes instructions to provide to the at least one second participant an invitation to join the collaborative communication event comprises providing a universal resource location address for the collaborative communication event to the at least one second participant.

14. The system of claim 9, wherein the one or more processors further execute instructions to provide a sub-topic notification between the first participant and the at least one second participant.

15. The system of claim 9, wherein to provide the document to all participants for view and/or editing, the one or more processors execute instructions to execute a proxy application for a document platform in a server.

16. A computer-implemented method comprising:
providing, by a first participant from a first client device to a remote server, a request for starting a collaborative communication event, the collaborative communication event comprising at least one second participant and a topic;
requesting to send to the at least one second participant an invitation to join the collaborative communication event;
receiving, from the remote server, a document associated with the collaborative communication event;
asynchronously requesting access to the collaborative communication event and permitting at least one third participant to access and modify the document in the collaborative communication event;
requesting, by the first participant to the remote server, to continue to participate in the collaborative communication event from a second client device;
storing the document in a memory for a second selected period of time, and storing in the memory a history log of actions by the first participant and the at least one second participant during the collaborative communication event; and
receiving a video feed from the first participant and providing the video feed to the second participant based on a configuration of the second client device, wherein the video feed is part of a rich actionable mention of the document by the first participant, and actionable by the second participant.

17. The computer-implemented method of claim 16, wherein the one of the first or second participants switches devices and continues to participate in the collaborative communication event, further comprising adjusting a configuration setting for the one of the first or second participants who switches devices in the collaborative communication event based on a capability of the first client device or the second client device.

18. The computer-implemented method of claim 16, further comprising receiving a notification, from the remote server, in the first client device of an action by the at least one second participant over the document.

19. The computer-implemented method of claim 16, further comprising displaying, in the first client device, a note pad comprising annotations to the document made by at least one of the first participant or the at least one second participant.

20. The computer-implemented method of claim 16, further comprising providing a sub-topic notification between the first participant and the at least one second participant.

* * * * *